United States Patent Office 3,268,480
Patented August 23, 1966

3,268,480
OIL-SOLUBLE POLYOXIMINO-CONTAINING POLYMERS
Adriaan H. Wagenaar and Maurits Krukziener, Amsterdam, Netherlands, assignors to Shell Oil Company, New York, N.Y., a corporation of Delaware
No Drawing. Original application Mar. 24, 1961, Ser. No. 98,008, now Patent No. 3,198,738, dated Aug. 3, 1965. Divided and this application Feb. 3, 1965, Ser. No. 430,198
Claims priority, application Netherlands, July 27, 1960, 254,244
5 Claims. (Cl. 260—63)

This patent application is a division of copending patent application, Serial No. 98,008, filed March 24, 1961, and is now U.S. Patent 3,198,738.

The invention relates to a new and novel class of oil-soluble polymers having two essential groups in the molecule, namely (I) oximino groups and (II) oleophilic hydrocarbyl groups having at least 8 carbon atoms. Oil-soluble polymers of the present invention posses detergent and wear inhibiting properties when added in small amounts to lubricants.

The novel polymers of the present invention are polymers having essentially a long linear hydrocarbon backbone chain and attached thereto in a uniform or random fashion are two essential groups, namely, (I) oximino groups (>C=N—OH) and (II) oleophilic groups containing hydrocarbyl radical of at least 8 and up to 30 or more carbon atoms. The two groups may be attached directly or indirectly to the hydrocarbon backbone chain. Thus the oximino groups may be bound to the backbone chain either directly or through a hydrocarbon group such as a methylene group or benzene group and the oleophilic group may be a hydrocarbon chain (R) of 8–30 carbon atoms attached directly to the backbone chain, e.g., $C_{12-18}$ straight or branched chain alkyl radical or attached through a polar group such as

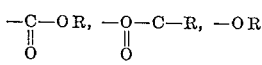

wherein R is as defined. Polymeric compounds of this type should have at least 150 carbon atoms in the backbone chain and a plurality of units (I) and (II) as described such that the molecular weight of the polymer ranges from about 5,000 to about 1,000,000, preferably from about 50,000 to 500,000.

The invention also relates to a process for the production of polymers of the present invention by copolymerizing a polymerizable compound containing at least one carbonyl group (>C=O) or a polar-containing polymerizable compound capable of being converted to carbonyl groups with a polymerizable compound containing a hydrocarbyl group of at least 8 carbon atoms and treating (oximizing or oximating said copolymer with a hydroxylamine, preferably in a neutral or basic medium of a pH of 7–10, preferably 7–8, so as to convert the carbonyl groups to oximino groups). Thus, the intermediate portion of the copolymers of this invention may be obtained by copolymerization of a monomer containing a carbonyl group with a monomer containing an oleophilic group having at least 8 carbon atoms, or a copolymer obtained indirectly from these monomers, for example by reducing ester groups to aldehyde groups of a polymer or copolymer containing ester groups, or for example by oxidation of secondary alcohol groups present in a polymer or copolymer to ketone groups. Also copolymers containing acetal groups and the oleophilic hydrocarbyl groups may be converted into carbonyl groups by treatment with mineral acid.

Examples of monomers of which the copolymers containing aldehyde groups may be composed are unsaturated aliphatic aldehydes. Preference is given to copolymers composed of acrolein or methacrolein and one or more monomers, or copolymers composed of a beta-formal acrylic acid ester, maleic di-aldehyde or fumaric di-aldehyde, and one or more monomers containing the oleophilic groups.

Copolymers containing ketone groups are also suitable copolymers which may be converted according to the invention into copolymers containing oximino groups.

Examples of suitable monomers of which copolymers containing ketone groups may be composed are unsaturated aliphatic ketones. Of these unsaturated aliphatic ketones methyl isopropenyl ketone in particular is suitable.

The monomers containing the oleophilic hydrocarbyl groups which may be used for the production of oil-soluble copolymers which contain carbonyl groups and are suitable for being converted into copolymers containing oximino groups are mono-olefins having a branched or straight carbon chain, in particular alpha-olefins having at least 10 carbon atoms, or esters of unsaturated organic mono- and dicarboxylic acids and saturated alcohols, or esters of saturated organic carboxylic acids and unsaturated alcohols, which esters contain a saturated branched or straight carbon chain having at least 8 carbon atoms, or unsaturated aliphatic ethers having a saturated branched or unbranched carbon chain containing at least 8 carbon atoms. If desired, mixtures of these monomers may be used, for example a mixture of stearyl methacrylate and lauryl methacrylate. Of the esters of unsaturated mono- and dicarboxylic acids and saturated alcohols esters of methacrylic acid are preferred, in particular methacrylic acid esters of which the ester group contains 12–18 carbon atoms. The esters of maleic acid and fumaric acid of which at least one of the ester groups contain at least 8 carbon atoms are also suitable for use.

Of the unsaturated aliphatic ethers preference is given to vinyl-alkyl ethers in which the alkyl group contains 12–18 carbon atoms.

The copolymerization of one or more (I) monomers with one or more (II) monomers may be carried out in any known manner. Copolymerization may, for example, be carried out by dissolving the monomers in a solvent, such as benzene, or in a mixture of solvents, such as a mixture of benzene and ethanol. A telomerization agent, such as nitrobenzene, may also be added to the solution of the monomers. The copolymerization may be initiated, for example by a thermal treatment or by the addition, possibly at elevated temperature, of an initiator such as dibenzoyl peroxide, azo-bis-isobutyronitrile or other radical-yielding sources. When an initiator is used the optimum copolymerization temperature depends on the rate at which the initiator decomposes. If the reactivity of the monomers is so divergent that the monomer ratio in the copolymer differs considerably from the ratio in which the monomers are brought together before copolymerization, one of the monomers may be added in portions thereby ensuring the formation of the copolymer having a homogeneous composition.

The following examples illustrate the preparation of polymers of the present invention.

*Example I*

253.5 parts by weight of stearyl methacrylate, 507 parts by weight of benzene and 2 parts by weight of benzoyl peroxide were introduced in a 2-liter three-necked flask provided with a drop funnel, reflux cooler and gas inlet tube. Nitrogen was then passed into the flask for one hour with stirring, after which 84 parts by weight of acrolein were added. The mixture was brought to a temperature of 80° C. by means of a heating bath. After the mixture had been stirred at this temperature for one hour one part by weight of benzoyl peroxide was added, followed by 0.375 part by weight of benzoyl peroxide, after which the mixture was stirred for 18 hours at 80° C. The total reaction time during which the mixture was continuously stirred and nitrogen was passed into the flask was 24 hours. After cooling the reaction mixture was poured out into 1600 parts by weight of methanol and the acrolein/stearyl methacrylate copolymer which separated was taken up in 500 parts by weight of benzene. This solution was poured out into 1600 parts by weight of methanol and the copolymer was separated washed with methanol. The copolymer was then taken up in benzene and the copolymer isolated by freeze drying from the resultant solution. The yield was 205.8 parts by weight of copolymer, i.e., 61% by weight based on the total quantity of starting monomers. The ratio of the component acrolein and stearyl methacrylate monomers in the copolymer was 1.27:1. The molecular weight, determined by the light scattering technique, was 98,000.

The copolymer was converted by reaction with hydroxylamine into a copolymer having oximino groups.

139 parts by weight of the hydrochloric acid salt of hydroxylamine were dissolved in 400 parts by weight of methanol. A solution of 115 parts by weight of potassium hydroxide in 200 parts by weight methanol was added to this solution. The potassium chloride which separated was removed by filtration and the filtrate having a pH of 7.5 was added to a solution of 203.7 parts by weight of the copolymer in 800 parts by weight of benzene. The mixture was stirred for 18 hours at room temperature and then boiled under reflux for 4 hours with continuous stirring. After the reaction mixture had been concentrated by solvent evaporation to a volume of approximately 700 parts by volume it was poured out into 1600 parts by weight of methanol. The copolymer which separated was washed with methanol, dissolved in 500 parts by weight of benzene and poured out into 1600 parts by weight of methanol. The copolymer which separated was washed with methanol, then dissolved in 500 parts by weight of benzene, after which the resultant solution was filtered. The product was isolated from the filtrate by freeze drying. A quantity of 188.9 parts by weight of the copolymer containing oximino groups was obtained. Analysis showed that the ratio of the component acrolein, acrolein oxime and stearyl methacrylate monomers in this copolymer was 0.4:0.88:1.

*Example II*

Acrolein and stearyl methacrylate were copolymerized in the presence of methanol and the copolymerization was carried out as follows:

A quantity of 1.5 parts by weight of benzoyl peroxide was added at a temperature of 80° C. and with stirring to a mixture of 84 parts by weight of acrolein, 338 parts by weight of stearyl methacrylate, 96 parts by weight of methanol and 633 parts by weight of benzene which was present in a nitrogen atmosphere. After 6, 22 and 28 hours further quantities of 1.0 part by weight, 1.0 part by weight and 0.72 part by weight of benzoyl peroxide, respectively were added. The total reaction time was 48 hours the temperature continuously maintained at 80° C. and nitrogen introduced through a gas inlet tube. After being cooled the reaction mixture was poured out into 2000 parts by weight of methanol and the copolymer separated was washed with methanol.

The resultant copolymer contained acetal groups which were split off by hydrolysis under the influence of hydrochloric acid in the following manner.

The copolymer was dissolved in 600 parts by weight of benzene and the solution mixed with 25 parts by volume of hydrochloric acid of 38% concentration, and 20 parts by weight of methanol. The mixture was boiled under reflux for 15 minutes and, after being cooled, subsequently poured out into 1600 parts by weight of methanol. The copolymers which separated was washed with methanol, dissolved in 500 parts by weight of benzene and the solution poured out into 1600 parts by weight of methanol. After the resultant copolymer had been washed with methanol it was re-dissolved in benzene and the copolymer was obtained from this solution by freeze drying. The yield was 256 parts by weight, i.e., 60.7 based on the total weight quantity of the monomers.

Analysis showed that the ratio of the components acrolein/dimethyl acetal:a c r o l e i n:stearyl methacrylate=0.42:0.22:1. The molecular weight, determined by the light scattering technique, was 151,000.

The copolymer was converted by reaction with hydroxylamine into a copolymer containing oximino groups.

146 parts by weight of the hydrochloric acid salt of hydroxy-amine were dissolved in 450 parts by weight of methanol. A solution of 48.3 parts by weight of sodium in 2000 parts by weight of methanol was added to this solution. After the mixture had been stirred for 2 hours, the resultant sodium chloride was filtered off and subsequently washed with methanol. The filtrate was concentrated by solvent evaporation by means of vacuum distillation at room temperature till the volume was approximately 700 parts by volume.

The solution of hydroxylamine in methanol of which the pH was 7.2 was added to a solution of 253.5 parts of the copolymer in 800 parts by weight of benzene. The mixture was boiled under reflux for 5.5 hours. After being cooled it was poured out into 2000 parts by weight of methanol, the product separated was taken up in 500 parts by weight of benzene and the resultant solution poured out into 1600 parts by weight of methanol. The product was then dissolved in 500 parts by weight of benzene and isolated from this solution by freeze drying. The yield was 236 parts by weight, the nitrogen content was 0.77% by weight.

The ratio of acrolein/dimethyl acetal:acrolein oxime:stearyl methacrylate in t h i s copolymer was 0.42:0.22:1.

*Example III*

Acrolein and stearyl methacrylate were copolymerized under conditions identical to those of Example I, but in this case the benzoyl peroxide was added in two portions, i.e., 0.7 part direct and 0.3 part after 16.5 hours.

The copolymer was isolated in the manner described in Example I. The yield was 56.3%. The monomer ratio of acrolein:stearyl methacrylate in the copolymer was 0.96:1, the molecular weight, determined by the light scattering technique, was 140,000.

The copolymer was reacted with hydroxylamine in the manner described in Example II, but the pH of the hydroxyl amine solution was 7.5.

The ratio of acrolein:acrolein oxime:stearyl methacrylate in the resultant product=0.38:0.57:1, and the nitrogen content was 2.0% by weight.

*Example IV*

Acrolein and stearyl methacrylate were copolymerized in benzene as solvent under the conditions of temperature, atmosphere and time as stated in Example I although not all the acrolein was added direct to the solution of stearyl methacrylate in benzene but was distilled from a distillation flask and passed into the reaction vessel in a period of 5 hours. Half of the quantity of benzoyl peroxide (1% by weight based on the total quantity of the monomers to be copolymerized) was immediately added, after which the other half was gradually added to the reaction mixture over a period of 5 hours.

The starting quantities were 114 parts by weight of acrolein, 338 parts by weight of stearyl methacrylate, 675 parts by weight of benzene and 4.5 parts by weight of benzoyl peroxide.

The reaction product was isolated in the manner described in Example I. The yield was 290 parts by weight, i.e., 64.2%.

Calculated from the data obtained by analysis, the ratio of the acrolein and stearyl methacrylate monomers in the copolymers was 0.80:1 and in the copolymer 24% of the number of aldehyde groups was present in the hydrate form. The molecular weight, determined by the light scattering technique, was 162,000.

The conversion into a copolymer having oximino groups by the reaction with hydroxyl amine was carried out in the manner described in Example II. A product containing 2.53% by weight of nitrogen was obtained. The ratio of acrolein:acrolein oxime:stearyl methacrylate in the copolymer was 0.07:0.73:1.

*Example V*

By the method similar to the one described in Example IV but in which the acrolein was distilled from a distillation flask and passed into the reaction vessel in a period of 1.25 hours and the benzoyl peroxide was gradually added in a period of 3 hours, a copolymer was obtained in a yield of 66.5% of which the monomer composition of acrolein:acrolein hydrate:stearyl methacrylate was 1.11:0.22:1. The molecular weight, determined by the light scattering technique, was 90,000.

This copolymer was converted with hydroxylamine obtained from the hydrochloric acid salt of hydroxyl amine and pyridine.

90 parts by weight of pyridine were added to a solution of 69.5 parts by weight of the hydrochloric acid salt of hydroxylamine in 160 parts by weight of methanol of 70% concentration. A solution of 210 parts by weight of the copolymer and 500 parts benzene was added to this mixture of which the pH was 6.7 and the resultant mixture was stirred at room temperature for 2 hours and then stirred and boiled under reflux for 3 hours. The copolymer was isolated from the cooled reaction mixture in the manner described in Example I. The yield was 206 parts by weight, the nitrogen content was 1.71% by weight. The monomer ratio of acrolein:acrolein oxime:stearyl methacrylate in the coplymer was 0.61:0.50:1.

*Example VI*

98 parts by weight of acrolein diethylacetal and 50.7 parts by weight of stearyl methacrylate were dissolved in 120 parts by weight of benzene. A quantity of 0.5 part by weight of azo-bis-isobutyronitrile was added to this solution. The temperature of the solution was brought to 65° C. and the solution was kept at this temperature for 50 hours with stirring. After 21 and after 29 hours respective quantities of 0.25 part by weight of azo-bis-isobutyronitrile were added. A nitrogen atmosphere was maintained during the reaction in the reaction vessel. The resultant copolymer was isolated as described in the previous examples. The yield was 51 parts by weight, i.e., 34.3%.

51 parts by weight of copolymer of acrolein-diethyl acetal and stearyl methacrylate were dissolved in 500 parts by weight of benzene. After the addition of 75 parts by volume of concentrated hydrochloric acid and 60 parts by weight of ethanol the mixture was boiled under reflux for 1 hour. When it was cooled the reaction mixture separated into two layers. The bottom layer was removed and the top layer washed with water and with a dilute sodium bicarbonate solution, after which the washed solution was transferred to a reaction vessel.

After the addition of a solution of 70 parts by weight of hydrochloric acid salt of hydroxyl amine and 60 parts by weight of potassium hydroxide in 1500 parts by weight of ethanol of 50% concentration the mixture was stirred at room temperature for 20 hours. After the aqueous layer had been separated the filtrate was concentrated by solvent evaporation and the resultant reaction product isolated by pouring out the mixture in methanol and washing it with methanol as described in the previous examples. The result was 47 parts by weight, the nitrogen content was 0.47% by weight. The monomer ratio of acrolein, acrolein oxime and stearyl methacrylate in the copolymer was 0.007:0.13:1.

*Example VII*

416 parts by weight of stearyl methacrylate and 106 parts by weight of methyl isopropenyl ketone were dissolved in 2088 parts by weight of benzene. After the addition of 5.8 parts by weight of benzoyl peroxide the temperature was raised to 80° C. and the mixture was kept at this temperature for 48 hours with stirring, refluxing of the evaporating solvent being ensured. After 6 hours 93 parts by weight of stearyl methacrylate was added as well as 5.8 parts by weight of benzoyl peroxide. After 32 hours 5.8 parts by weight of benzoyl peroxide were again added.

The product was isolated by pouring out the mixture into methanol, taking up the copolymer which separated into benzene, by again pouring out the solution into methanol as described in the previous examples. The yield was 448 parts by weight of stearyl methacrylate/methyl isopropenyl ketone copolymer. The ratio of the methyl isopropenyl ketone and stearyl methacrylate monomers in the copolymer was 0.137:1.

224 parts by weight of the resultant copolymer were dissolved in 725 parts by weight of benzene. A solution of 24.75 parts by weight of hydroxyl amine in 250 parts by weight of methanol obtained from the hydrochloric acid salt of hydroxyl amine and sodium methylate as described in Example II, was added to this solution. The mixture was boiled under reflux and stirred for 5.5 hours. The reaction product was isolated by pouring out the reaction mixture in methanol as described in the previous examples.

The nitrogen of the resultant product was 0.56 part by weight. The ratio of the methyl isopropenyl ketone oxime and stearyl methacrylate monomers in the copolymer was 0.137:1. The yield was 225 parts by weight.

The copolymers according to the invention may be added as such to lubricating oils in amounts of from 0.001% to 10%, preferably from 0.1% to 5% by weight. In an advantageous embodiment the product is only partly freed from the solvent, for example by steam distillation, after which a small quantity of a lubricating oil is added and the remainder of the solvents is finally distilled off by means of steam, preferably under reduced pressure. The resultant concentrate can then be diluted with a lubricating oil such as mineral lubricating oil (X) which is an extracted Venezuelan paraffinic lubricating oil having a viscosity of 114 cs. at 100° F., or a California mineral lubricating oil (Y) having the following properties:

Gr, ° API, 60/60° F. _____ 32
Flash, ° F. _____ 370
Viscosity index (Dean and Davis) _____ 93
Viscosity, SUS at 100° F. _____ 103

The following non-ash compositions are representative of this invention:

Composition A:                                   Percent weight
    Example I copolymer _____ 2
    Mineral lubricating oil (X) _____ Balance
Composition B:
    Example II copolymer _____ 2
    Mineral lubricating oil (X) _____ Balance
Composition C:
    Example III copolymer _____ 2
    Mineral lubricating oil (X) _____ Balance
Composition D:
    Example IV copolymer _____ 2
    Mineral lubricating oil (X) _____ Balance
Composition E:
    Example V copolymer _____ 2
    Mineral lubricating oil (X) _____ Balance
Composition F:
    Example I copolymer _____ 2
    4,4'-methylene bis(2,6-ditert.butyl phenol) ____ 0.75
    Mineral lubricating oil (X) _____ Balance Composition G: Percent weight
  Example I copolymer _____ 5
  4,4'-methylene bis(2,6-ditert.butyl phenol) ____ 0.5
  Tricresyl phosphate _____ 0.8
  Mineral lubricating oil (X) _____ Balance
Composition H:
  Example I copolymer _____ 5
  4,4'-methylene bis(2,6-ditert.butyl phenol) ____ 0.5
  $P_2S_5$-terpene reaction product _____ 1
  Mineral lubricating oil (X) _____ Balance
Composition I:
  Example I copolymer _____ 2
  Fuel oil (No. 2) _____ Balance To illustrate the superior and unexpected results obtained with compositions of the present invention the following compositions shown in Table I were engine tested in a (1) Caterpillar diesel engine, (2) Gardner diesel engine, (3) Petter gasoline engine and in (4) a C.F.R. gasoline engine and the results were as follows:

TABLE I

| Composition | (1) a Piston Fouling Rating (10=perfect) | (2) a Piston Fouling Rating (10=perfect) | (3) a High Temp. Condition Piston Fouling Rating (10=clean) | (3) a Low Temp. Condition Sludge Rating (10=clean) | (4) a Percent Reduction in Piston Ring Wear Compared to Neat Oil |
|---|---|---|---|---|---|
| E | 7.0 | | | | |
| A | | 7.7 | | 7.8 | 47 |
| C | | | | | 30 |
| D | | 8 | | | |
| B | | | | 6.5 | |
| F | | | 7 | | |
| Mineral lubricating oil (X) | 4.7 | 4.4 | 4.1 | 4.4 | |
| Mineral lubricating oil (X) plus 15% 4,4'-methylene bis(2,6-ditert.butyl phenol) | | | 5.6 | | | a Engine test conditions.

CATERPILLAR DIESEL ENGINE

Water-cooled, single-cylinder, four-stroke engine. The test lasted 48 hours. The fuel was a gas oil having a sulfur content of 0.9% by weight. The cooling water temperature was about 80° C. The engine power was 18 H.P., bore 146 mm., stroke 203.2 mm., swept volume 3.4 liters.

GARDNER DIESEL ENGINE

Water-cooled, single-cylinder, four stroke engine. The test lasted 17 hours. The fuel was a gas oil having a sulfur content of 0.9% by weight. The cooling water temperature was about 80° C. The engine power was 11 H.P., bore 108 mm., stroke 152.4 mm., swept volume 1.4 liters.

C.F.R. GASOLINE ENGINE

Water-cooled, single-cylinder, four-stroke engine, bore 83.85 mm., stroke 114.3 mm., swept volume 628 cu. cm. The test lasted 45 hours. The fuel was a gasoline having a sulfur content of 0.05% by weight and contained 1.2 ml. TEL per U.S. gallon. The cylinder cooling water-temperature was approximately 40° C.

PETTER GASOLINE ENGINE NO. 1

Water-cooled, single-cylinder four-stroke engine, bore 85 mm., stroke 82.5 mm., swept volume 468 cu. cm. The test lasted 28 hours. The fuel was a motor gasoline having 1.2 ml. TEL per U.S. gallon and a sulfur content of 0.05% by weight. The temperature of the cooling water of the cooled valve cover was approximately 20° C.

PETTER GASOLINE ENGINE NO. 2

Cooled single-cylinder, four-stroke engine, bore 85 mm., stroke 82.5 mm., swept volume 468 cu. cm. The test lasted 48 hours. The fuel was a motor gasoline having 1.2 ml. TEL per U.S. gallon and a sulfur content of 0.05% by weight. The cooling liquid temperature was approximately 160° C.

Lubricating compositions of this invention are particularly applicable for high temperature, high speed use as in aviation engines, automotive engines, truck engines as well as industrial equipment.

We claim as our invention:

1. As a new product an oil-soluble polyoximino-containing copolymer obtained by polymerizing at reflux temperature and in the presence of a free radical initiator, a polymerizable unsaturated carbonyl-containing compound selected from the group consisting of acrolein, methacrolein and methyl isopropenyl ketone and $C_{12-18}$ alkyl methacrylate in the mol ratio of from about 0.1:1 to about 2:0.1, respectively, and reacting said copolymer with hydroxylamine at a pH of 7–10, to effect conversion of the carbonyl groups to oximino groups, said copolymer having a molecular weight of from 50,000 to 1,000,000.

2. As a new product, an oil-soluble polyoximino-containing copolymer obtained by polymerizing acrolein and $C_{12-18}$ alkyl methacrylate and reacting said copolymer with hydroxylamine at a pH of 7–8 to effect conversion of the carbonyl groups to oximino groups, said copolymer having a molecular weight of from 50,000 to 500,000.

3. As a new product, an oil-soluble polyoximino-containing copolymer obtained by polymerizing acrolein and stearyl methacrylate and reacting said copolymer with hydroxylamine at a pH of 7–8 to effect conversion of the carbonyl groups to oximino groups, said copolymer having a molecular weight of from 50,000 to 500,000.

4. As a new product, an oil-soluble polyoximino-containing copolymer obtained by polymerizing acrolein diethylacetal and stearyl methacrylate and reacting said copolymer with hydroxylamine at a pH of 7–8 to effect conversion of the carbonyl groups to oximino groups, said copolymer having a molecular weight of from 50,000 to 500,000.

5. As a new product, an oil-soluble polyoximino-containing copolymer obtained by polymerizing methyl isopropenyl ketone and stearyl methacrylate and reacting said copolymer with hydroxylamine at a pH of 7–8 to effect conversion of the carbonyl groups to oximino groups, said copolymer having a molecular weight of from 50,000 to 500,000.

References Cited by the Examiner
UNITED STATES PATENTS
2,985,610  5/1961  Blanchette et al. ____ 260—63
3,198,738  8/1965  Wagenaar et al. ____ 260—23

WILLIAM H. SHORT, *Primary Examiner.*

C. A. WENDEL, *Assistant Examiner.*